United States Patent
Weinberg et al.

(10) Patent No.: US 9,086,275 B2
(45) Date of Patent: Jul. 21, 2015

(54) SYSTEM AND METHOD FOR LIDAR SIGNAL CONDITIONING

(71) Applicant: Analog Devices, Inc., Norwood, MA (US)

(72) Inventors: Harvey Weinberg, Sharon, MA (US); Robert Adams, Acton, MA (US)

(73) Assignee: Analog Devices, Inc., Norwood, MA (US)

( * ) Notice: Subject to any disclaimer, the term of this patent is extended or adjusted under 35 U.S.C. 154(b) by 12 days.

(21) Appl. No.: 13/951,924

(22) Filed: Jul. 26, 2013

(65) Prior Publication Data
US 2015/0028213 A1 Jan. 29, 2015

(51) Int. Cl.
G01C 3/08 (2006.01)
G01S 17/10 (2006.01)
G01S 7/486 (2006.01)
G01S 17/93 (2006.01)

(52) U.S. Cl.
CPC .............. *G01C 3/08* (2013.01); *G01S 7/4861* (2013.01); *G01S 17/10* (2013.01); *G01S 17/936* (2013.01)

(58) Field of Classification Search
CPC ...................................................... G01N 25/72
USPC ........................................................ 250/340
See application file for complete search history.

(56) References Cited

U.S. PATENT DOCUMENTS

| | | | |
|---|---|---|---|
| 6,597,299 B1 | 7/2003 | Bugeja | 341/122 |
| 2005/0024249 A1* | 2/2005 | Pavicic | 341/155 |
| 2008/0100822 A1* | 5/2008 | Munro | 356/4.01 |

OTHER PUBLICATIONS

Stimson, George W., "Pulse Delay Ranging," *Introduction to Airborne Radar*, Chapter 12, pp. 203-214, Dated 1993.

* cited by examiner

*Primary Examiner* — David Porta
*Assistant Examiner* — Hugh H Maupin
(74) *Attorney, Agent, or Firm* — Sunstein Kann Murphy & Timbers LLP

(57) ABSTRACT

Various embodiments provide systems and methods that allow a LIDAR system to sense nearby objects with relatively low-cost elements, and fewer elements than traditional LIDAR systems by sampling an infrared pulse at a high sample rate and storing the samples in the analog domain. The samples may then be digitized at a rate slower than the sample rate.

20 Claims, 9 Drawing Sheets

Transmitted Pulses

Reflection Pulses

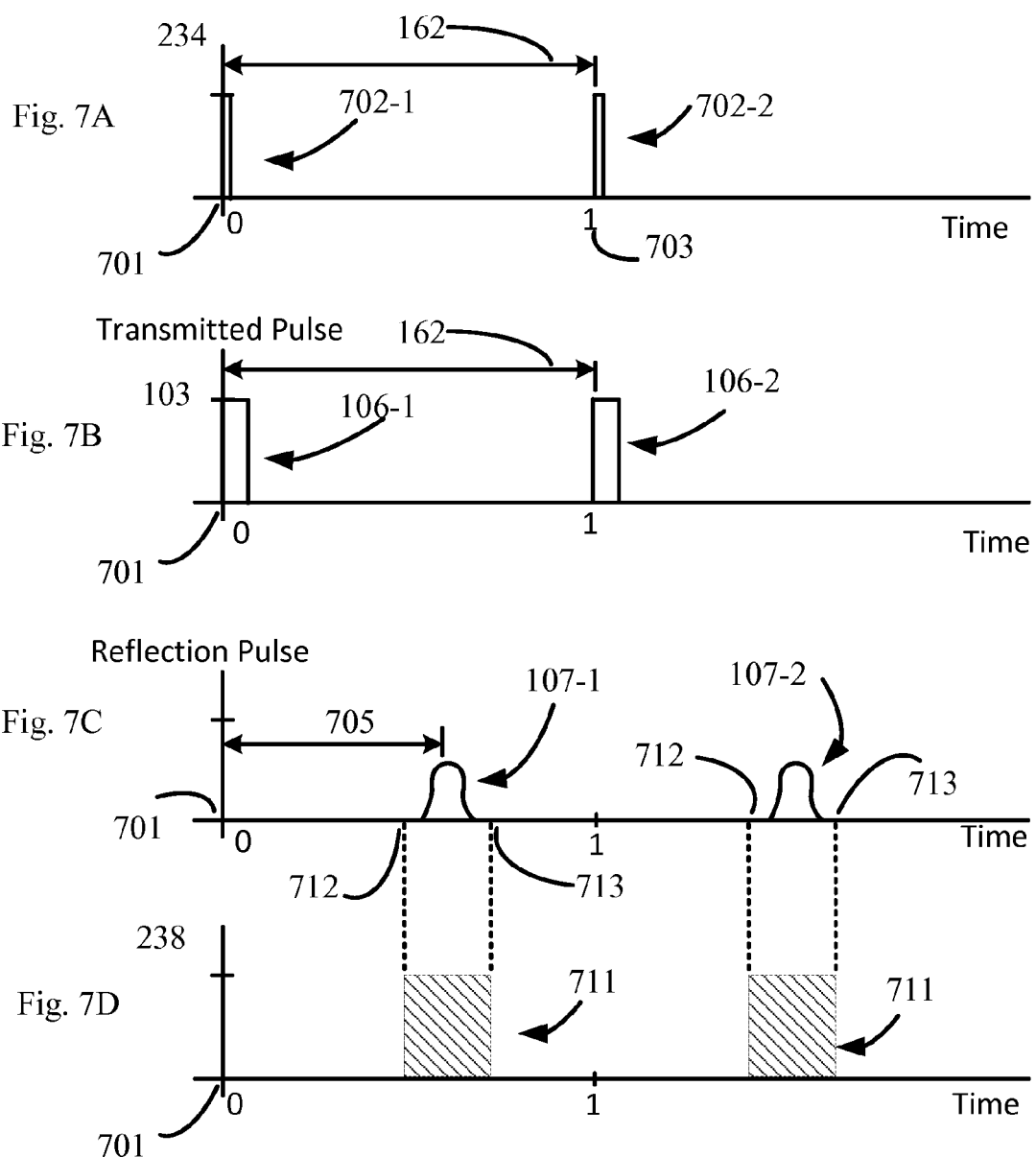

SYSTEM AND METHOD FOR LIDAR SIGNAL CONDITIONING

TECHNICAL FIELD

The present invention relates to infrared distance detection systems, and more particularly to system for determining the distance of an object from a transceiver by timing the reflection of an infrared pulse.

BACKGROUND ART

It is known in the prior art to determine the distance between an object and a vehicle by illuminating the object with an infrared pulse, and measuring the time required for a reflection pulse to return to an infrared receiver from the object.

Because the distance of the object from the vehicle is not precisely known before the receipt of the reflected pulse, detection of the reflection pulse typically requires sampling the output of the infrared receiver at a variety of distinct times and identifying which sample (if any) has an amplitude that indicates receipt of at least a portion of a reflected infrared pulse. Further, the reflected pulse may be distorted and spread out over time, such that portions of the reflection may be captured by several samples, and the difference in amplitude from one sample to the next may be small. Sampling such signals with an analog-to-digital converter would require a very fast, high resolution analog-to-digital converter.

SUMMARY OF THE EMBODIMENTS

In a first embodiment, a method of processing an analog signal, the method includes capturing, at a sampling frequency, a plurality of samples of the analog signal in the analog domain, such that the plurality of samples represents the analog signal at a plurality of sequential times; storing each of the plurality of samples in a corresponding plurality of analog storage elements; sequentially retrieving, at a retrieval frequency, each of the plurality of stored samples from the plurality of analog storage elements, the retrieval frequency being slower than the sampling frequency. Further, in some embodiments, the step of sequentially retrieving, at a retrieval frequency, each of the plurality of stored samples further includes converting each of the plurality of stored samples to a digital format. In addition, the step of sequentially retrieving each of the plurality of stored samples further includes determining which of the stored samples has the greatest amplitude, or which represents a rising edge of the analog signal.

Some embodiments also include transmitting a sequence of infrared pulses, the sequence including a first transmitted pulse and a subsequent second transmitted pulse. In such embodiments, the analog signal represents a received reflection of the first transmitted pulse, and the step of sequentially retrieving each of the plurality of stored samples is completed before the transmission of the subsequent second infrared pulse.

Another embodiment includes a method of detecting an object using infrared pulses. The method includes transmitting a plurality of infrared pulses from an infrared transmitter; and receiving, at an infrared receiver, a plurality of infrared reflections, the plurality of infrared reflections including reflections of the transmitted pulses from the object. Then, in a sample capture phase, for each of the plurality of infrared reflections the method includes capturing a plurality of analog samples at a plurality of distinct sample times; and summing, in the analog domain, each of the plurality of analog samples with all samples from corresponding sample times from all previous infrared reflections, in a corresponding plurality of analog storage elements, such that each of the plurality of analog storage elements stores an analog value representing a sum of corresponding samples.

In addition, in a readout phase following the sample capture phase, the method may also include a readout phase, which includes sequentially retrieving, at a retrieval frequency, each of the plurality of stored samples from the plurality of analog storage elements, the retrieval frequency being slower than the sampling frequency. In various embodiments, the step of retrieving each of the plurality of stored samples also includes determining which of the stored samples has the greatest amplitude. Some embodiments further include a discharge phase, which includes discharging each of the analog storage elements after the readout phase.

In some embodiments, the step of sequentially retrieving each of the plurality of stored samples further includes converting the analog values to a digital format using an analog-to-digital converter to produce a corresponding plurality of digital sums.

In addition, in some embodiments, the infrared receiver is configured to output a current proportional to an amplitude of an impinging infrared pulse, each of the analog storage elements includes a capacitor, and each of the analog values includes a voltage.

A system for sampling a plurality of infrared pulses impinging on a receiver includes an infrared receiver configured to provide an analog output in response to (e.g., as a function of) infrared radiation impinging on the infrared receiver; a switching network comprising a first terminal coupled to the infrared receiver and configured to receive the analog output, and a plurality of output terminals; and a plurality of analog storage elements, each of the analog storage elements coupled to a corresponding one of the plurality of output terminals and configured to hold a plurality of sequential samples. In a sample capture configuration, the analog output of the infrared receiver may be sequentially coupled via the switching network to the plurality of analog storage elements. In some embodiments, the switching network may include a switching circuit including a first terminal coupled to the infrared receiver and configured to receive the analog output, and a second terminal, the second terminal controllably couplable to the first terminal; and a bi-directional analog multiplexing circuit including an input terminal coupled to the second terminal of the switching circuit, and a plurality of output terminals. In other words, the switching network may include a switching circuit having a first terminal coupled to the infrared receiver and configured to receive the analog output, and a second terminal, the second terminal controllably couplable to the first terminal, and a third terminal, wherein the second terminal is also controllably couplable to the third terminal, and a bi-directional analog multiplexing circuit having an input terminal coupled to the second terminal of the switching circuit, and a plurality of output terminals.

In some embodiments of the system, the analog output of the infrared receiver is a current proportional to the intensity of infrared radiation impinging on the infrared receiver; and the plurality of analog storage elements include a plurality of capacitors. Further, some systems also include an amplifier configured to buffer the current output of the infrared receiver and to supply a buffered current to the bi-directional analog multiplexing circuit via the switching circuit.

Further, in some systems, the switching circuit further includes a third terminal, and the second terminal is controllably couplable to the third terminal. In addition, such systems also includes an analog-to-digital converter configured to be controllably coupled to the plurality of analog storage elements via the bi-directional analog multiplexing circuit and the switching circuit when the system is in a readout configuration.

To control the operation of the elements of the system, some systems include a control circuit, the control circuit configured to control the bi-directional analog multiplexing circuit and the switching circuit to operate in a sampling mode in which the output of the infrared receiver is sequentially coupled to each of the analog storage elements via the bi-directional analog multiplexing circuit and the switching circuit, and in a readout mode in which each of the analog storage elements is sequentially coupled to an analog-to-digital converter via the bi-directional analog multiplexing circuit and the switching circuit. Indeed, in some systems, the switching network includes a grounded terminal, and the control circuit is configured to sequentially couple each of the analog storage elements to ground via the switching network (e.g., via a bi-directional analog multiplexing circuit) and the grounded terminal, when the system is in a discharge configuration.

In some embodiments, the system includes a control circuit configured to control the bi-directional analog multiplexing circuit and the switching circuit; and an infrared transmitter configured to transmit pulses of infrared radiation under control of the controller. The controller coordinates the transmission of a plurality of infrared pulses and the sampling of reflections of said plurality of infrared pulses from a remote object.

In some embodiments, the analog storage elements are a plurality of capacitors, the plurality of capacitors including first capacitor configured to store a first sample, and a plurality of subsequent capacitors each configured to store one of a plurality of subsequent samples, such that each of the subsequent capacitors is associated with an immediately preceding capacitor within the plurality of capacitors, and wherein each of the subsequent capacitors has a smaller capacitance than the first capacitor, and each of the subsequent capacitors is related to its immediately preceding capacitor by the following formula:

$$C_{n+1} = MC_n$$

wherein $C_{n+1}$ is a capacitor, $C_n$ is its immediately preceding capacitor, and M is a scalar having a value less than one.

In yet another embodiment, a system for sampling a plurality of infrared pulses impinging on a receiver includes: transducing means configured to convert the plurality of infrared pulses to a corresponding plurality of current pulses; sampling means configured to sample, in the analog domain, the plurality of current pulses; and means for summing, in the analog domain, the plurality of current pulses. Indeed, some such systems include a controller means configured to control the sampling means, and configured to control an analog-to-digital converter means.

BRIEF DESCRIPTION OF THE DRAWINGS

The foregoing features of embodiments will be more readily understood by reference to the following detailed description, taken with reference to the accompanying drawings, in which:

FIGS. 7A-7D schematically illustrates the relative timing of the operation of a signal processing circuit.

DETAILED DESCRIPTION OF SPECIFIC EMBODIMENTS

Various embodiments provide systems and methods that allow a signal to be rapidly sampled, without the need for expensive and/or power hungry high-speed analog-to-digital converters. Instead of sampling an impinging infrared pulse with an extremely fast and expensive analog-to-digital converter, various embodiments capture many samples of each pulse in a sequence of pulses at a high sample rate, and store the pulses into a corresponding number of analog storage elements. After the samples are captured and stored, they may be read-out of the analog storage elements at a rate much slower than the sample rate, and digitized by a relatively slow (i.e., having a conversion rate slower than the sample rate), but accurate and inexpensive, analog-to-digital converter.

For example, various embodiments provide systems and methods for sampling a pulsed signal, or a rapid series of pulsed signals, in the analog domain. Such systems and methods avoid expensive analog-to-digital converters, while still providing signal processing for very short signal pulses, or rapidly repeating pulses.

Figure 1A:
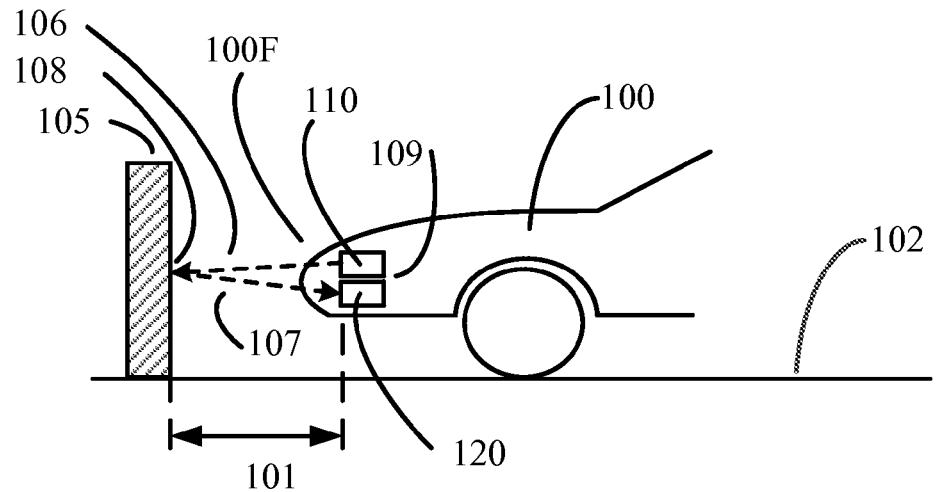
FIG. 1A schematically illustrates an embodiment of a laser detection and ranging system in an automobile.
Figure 1B:
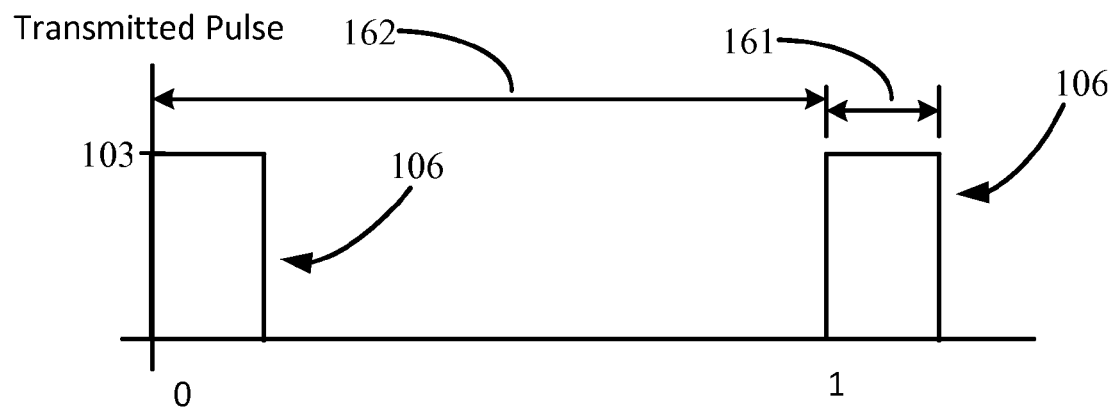
FIG. 1B schematically illustrates infrared pulses transmitted by a laser detection and ranging system.

These systems and methods maybe useful for a wide variety of applications in which it may be desirable to rapidly sample a signal without expensive hardware. As just one example, such systems and methods may be useful in processing reflected signals in automotive proximity sensing circuits, as schematically illustrated in FIG. 1, for example. The automobile 100 includes a signal processing system 109 that includes an infrared transmitter 110 and a receiver 120. The transmitter 110 is configured to transmit an infrared pulse 106 having an amplitude 103 (FIG. 1B), or a series of such pulses, in the direction of the front 100F of the automobile 100. Each pulse 106 has a pulse width 161, and successive pulses 106 define a period, or time between pulses 162, as schematically illustrated in FIG. 1B.

If an object 105 is disposed in front of the automobile 100, a transmitted pulse 106 will reflect off of the object 105 to create a reflected pulse 107 (FIG. 1C), such that a portion of the energy in the transmitted pulse 106 returns in the direction of the automobile 100 in reflection pulse 107 and is received at an infrared receiver 120.

Preferably, the reflected pulse 107 retains the same shape and same total energy as the transmitted pulse 106. In practice, however, a transmitted pulse weakens with the distance (e.g., distance 101 along road 102) of its travel from its source. For example, it is known that an electromagnetic signal weakens with the square of its distance from its transmitter. A focused beam of radiation may have different dissipation characteristics.

Depending on the size, shape and material of the object 105, the transmitted pulse 106 may be completely, or nearly completely, reflected from the object 105 back towards the receiver 120 (e.g., from a reflection point 108) in a reflection pulse 107 having an amplitude 104.

Alternately, a point of reflection 108 from the reflecting object 105 may become, in essence, a point source of infrared radiation. In such a case, the reflected pulse 107 also dissipates with the square of the distance traveled from that point source. As such, the energy of a reflection pulse 107 depends on the total distance it travels from its course (transmitter 110) to its reflection point (108), and then to the receiver 120. This distance may be referred to as its "flight distance" and the time between transmission of the transmitted pulse 106 to the receipt of the reflected pulse 107 may be referred to as the signal's "flight time" (or "time of flight").

Figure 1C:
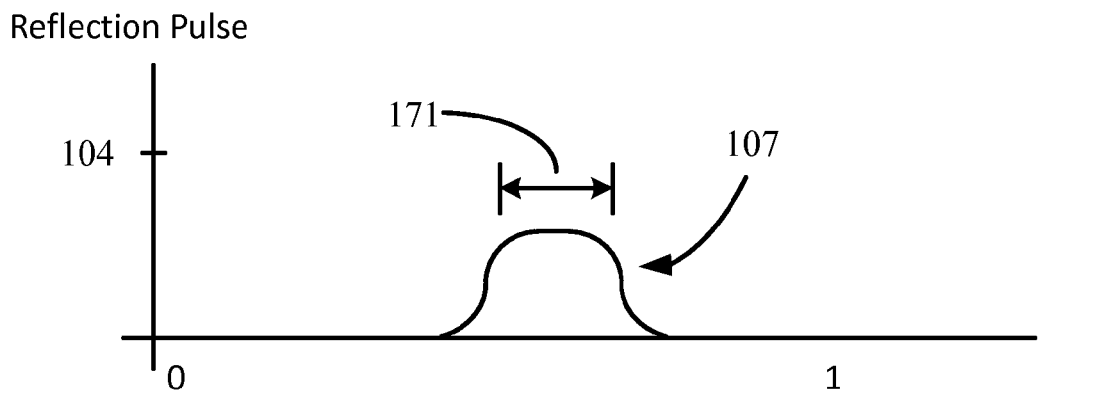
FIGS. 1C and 1D schematically illustrate a reflected infrared pulse received by a laser detection and ranging system.

As schematically illustrated in FIG. 1C and described below, the amplitude 104 of the reflected pulse 107 may be less than the amplitude of the transmitted pulse 106.

Typical automotive object detection systems are configured to detect objects in very close proximity to a vehicle, such as objects as close as a few centimeters from a vehicle, for example. As such, the flight time of an infrared signal is very short. For example, if the total flight distance of an infrared pulse is 2 meters through air (e.g., from a transmitter to an object 1 meter from the transmitter, and from the object to a receiver, at 299,705 km/s), the flight time will be approximately 6.6 nanoseconds. As such, to avoid overlap between signals, the time 162 between a transmitted pulse 106 and a subsequent transmitted pulse 106 is preferably greater than the maximum possible time between transmission of a transmitted pulse 106 and receipt of a corresponding reflection pulse 107 for the range (e.g., 101) of interest. Nevertheless, the time 162 between a transmitted pulse 106 and a subsequent transmitted pulse 106 can be very short—e.g., on the order of nanoseconds or tens of nanoseconds. As such, the pulse width 160 of a transmitted pulse 106 must be very short, preferably substantially less than the time 162 between a transmitted pulse 106 and a subsequent transmitted pulse 106.

In addition, the reflection pulse 107 may be distributed over a greater span of time than the transmitted pulse 106 (that is, the pulse width 171 of a reflected pulse 107 may be greater than the pulse width 161 of the corresponding transmitted pulse). As such, a reflection pulse 107 typically has less energy than its counterpart transmitted pulse 106, and that energy is spread over a larger span of time that the counterpart transmitted pulse 106, with the result that the reflection pulse 107 may be difficult to detect, and the precise arrival time of the reflection pulse at the receiver 120 may be difficult to determine.

To process a reflection signal 107, the receiver 120 samples the reflection signal 107 at many points over span of time in which the reflection pulse 107 may be received at the receiver 120. Because the exact arrival time of the reflection pulse 107 is not precisely known, and may not even be approximately known, a sampling circuit may be configured to take samples over a broad span of time after the transmitted pulse 106 is transmitted, so as to increase the chances of capturing samples of the reflection pulse 107. As a practical matter, this means that some samples may miss the reflection pulse altogether, if those samples are captured before the arrival of the reflection pulse 107 (e.g., samples at times 150-1 and 150-2 in FIG. 1D) or after the reflection pulse has passed (e.g., a sample at time 150-$n$).

Figure 1D:
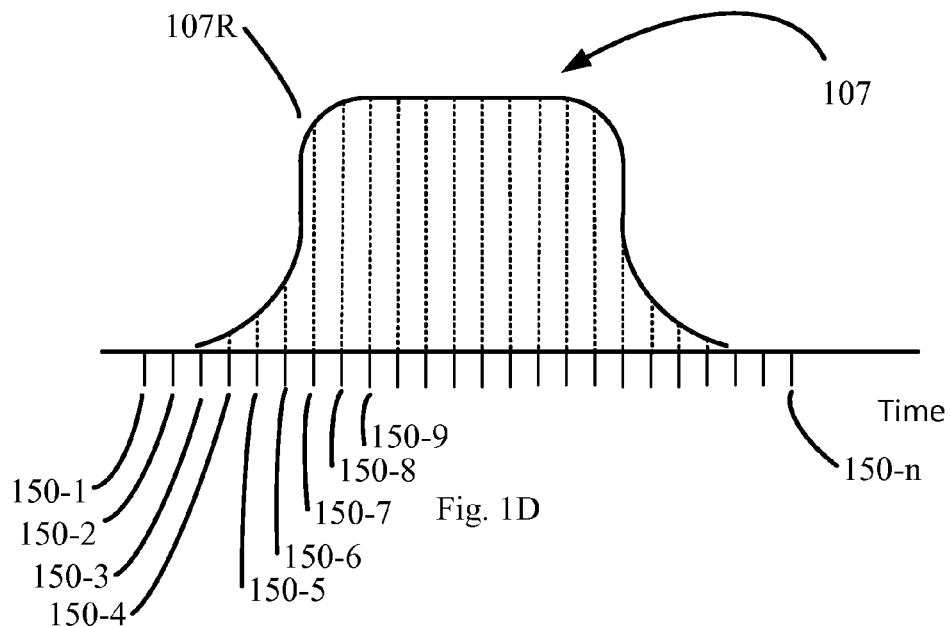

An example of a method of sampling of a reflection signal is schematically illustrated in FIG. 1D, in which a sampling circuit sequentially captures a set of samples of the reflection pulse 107.

A sampling circuit could employ a very fast analog-to-digital converter for the purpose of sampling the reflection pulse 107, or an array of analog-of-digital converters, but such a circuit would be expensive and consume large amounts of power. In an automotive context, such a circuit would be undesirably large and add undesirable weight to an automobile in which the circuit was disposed. In contrast, various embodiments described herein rapidly sample the reflection pulse 107 in the analog domain, and store or process the samples in the analog domain, thereby avoiding the expense and complexity of prior art systems.

Figure 2A:
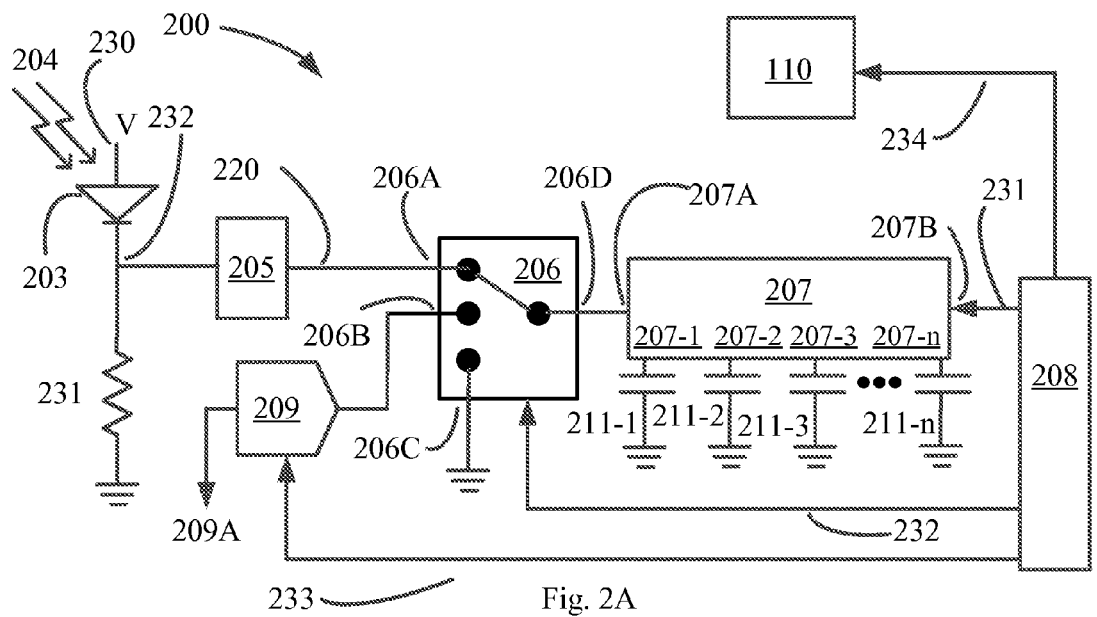
FIG. 2A schematically illustrates an embodiment of a circuit for processing one or more reflected infrared pulses.
Figure 2B:
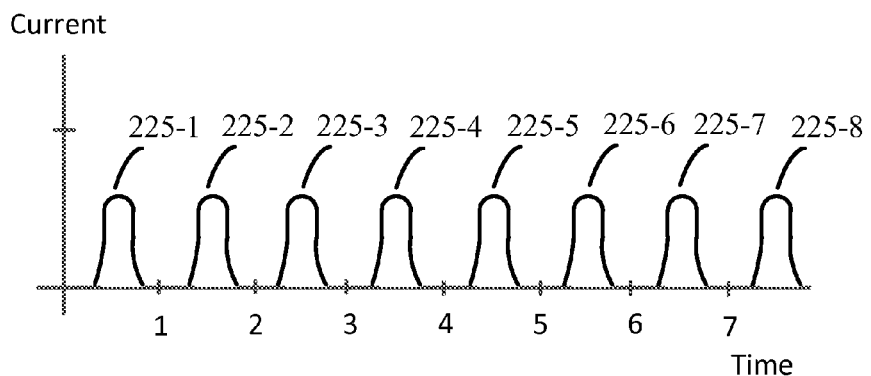
FIG. 2B schematically illustrates a series of current pulses corresponding to a series of reflected infrared pulses received by a receiver.
Figure 2C:
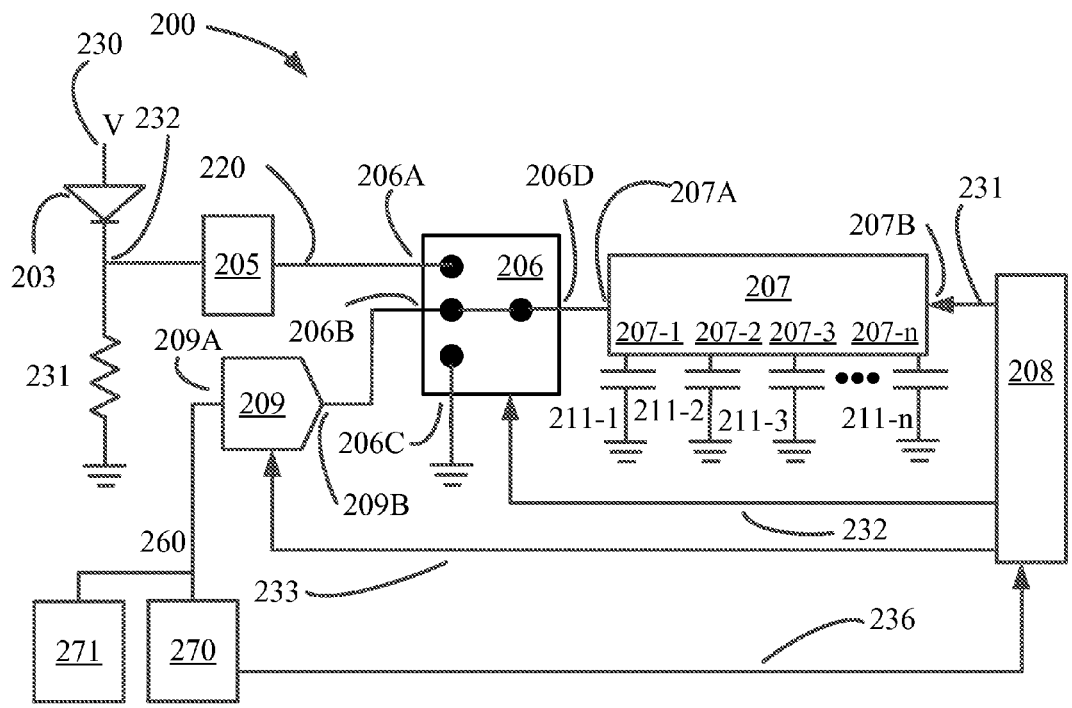
FIGS. 2C and 2D schematically illustrates the circuit of FIG. 2A in various operational configurations.
Figure 2D:
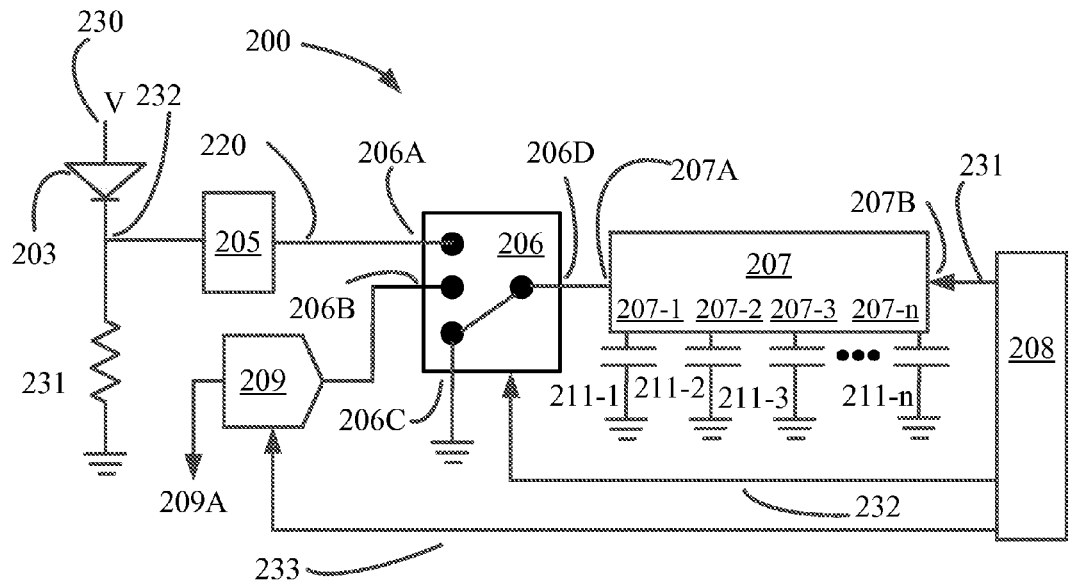

An embodiment of a rapid analog sampling and signal processing circuit 200 according to a first embodiment is schematically illustrated in FIG. 2A, FIG. 2C and FIG. 2D. The sampling circuit 200 is configurable, under the control of controller 208, to operate in a variety of modes, including a sample capture mode, a conversion mode, and a discharge mode, as described further below.

The circuit 200 includes, among other things, an infrared receiving element 203, a buffer amplifier 205, a switching network (e.g., switch 206 and analog bi-directional multiplexer 207), analog storage elements (211-1, 211-2 . . . 211-$n$), and an analog-to-digital converter (209).

Several of the circuit elements operate under the coordination and control of a controller 208. For example, to coordinate or synchronize the transmission of a transmission pulse with the sampling of the output of the amplifier 205, the controller 208 may control the transmitter 110 by providing control signals to the transmitter 110 via transmitter control bus 234.

In some embodiments, the controller 208 may be a programmed microcontroller or microprocessor, or may be under control of a programmed processor (e.g., processor 721 via control lines 236). Alternately, the controller may be part of, or implemented on, a programmed processor (e.g., microcontroller or microprocessor 721). In other embodiments, the controller 208 may be a state machine configured to produce the various control signals described herein, for example in response to the transmission of a transmission pulse 107.

In operation, infrared radiation 204 from a reflection pulse (e.g., 107) impinges on an infrared diode 203, causing the infrared diode 203 to conduct and draw current from power supply 230 to ground through resistor 231. The amplitude of the current is a function of the intensity of the infrared radiation impinging on the diode 203, and may, for example, be proportional to the intensity of the infrared radiation impinging on the diode 203. In the embodiment of FIG. 2A, a transconductance amplifier 205 is coupled to a node 232 between the resistor 231 and infrared diode 203, and produces and output current at node 220, as schematically illustrated in FIG. 2B.

Figure 2E:
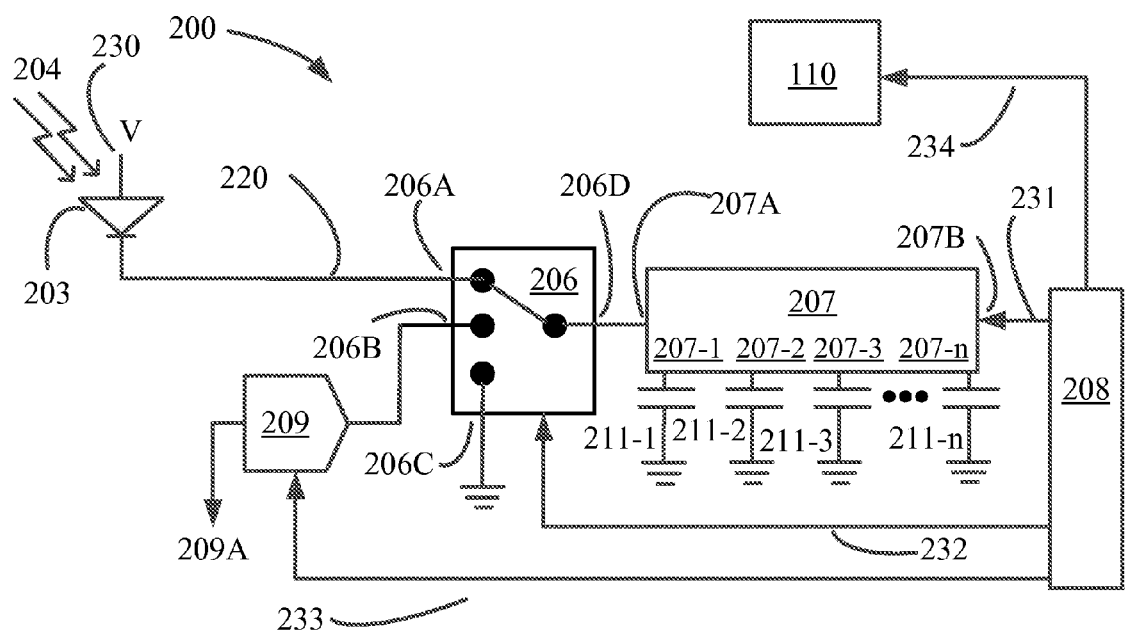
FIG. 2E schematically illustrates an alternate embodiment of a circuit for processing one or more reflected infrared pulses.

In an alternate embodiment, the analog output of the diode 203 may be an analog current, and the amplifier 205 may be optional, and may be omitted for example if the current output is diode 203 is sufficient to charge the storage elements (e.g., 211-1) without a buffer. In such an embodiment, the output current from diode 203 is coupled directly to terminal 206A of switching circuit 206, for example as schematically illustrated in FIG. 2E. Otherwise, the amplifier 205 may be a current amplifier configured to buffer the current output of the infrared receiver 203 and to supply a buffered current 225 to the bi-directional analog multiplexing 207 circuit via the switching circuit 206.

The output current 225 is proportional to the intensity (amplitude) of the reflection pulse 107. As such, each reflection pulse 107 has been transduced into a current pulse 225. Similarly, a series of reflection pulses (e.g., 107-1, 107-2 . . . 107-7, etc.; FIG. 1F) are transduced to a corresponding series of current pulses (e.g., 225-1, 225-2 . . . 225-7, etc.; FIG. 2B).

The current pulses 225 are coupled to the input 207A of a bi-directional multiplexer 207 via a switching circuit 206. The switching circuit 206, in this embodiment, has is a three-pole (206A, 206B, 206C), single-throw (206D) switch capable of carrying any electrical signal (e.g., voltage or current) in both directions. As such, the switching circuit 206 may be referred to as a bi-directional multiplexing circuit.

In yet another embodiment, the amplifier 205 may be a voltage buffer, in which case the analog signal presented to, and stored by, the storage elements (211-1, 211-2 . . . 211-n), will be a voltage.

Figure 3:
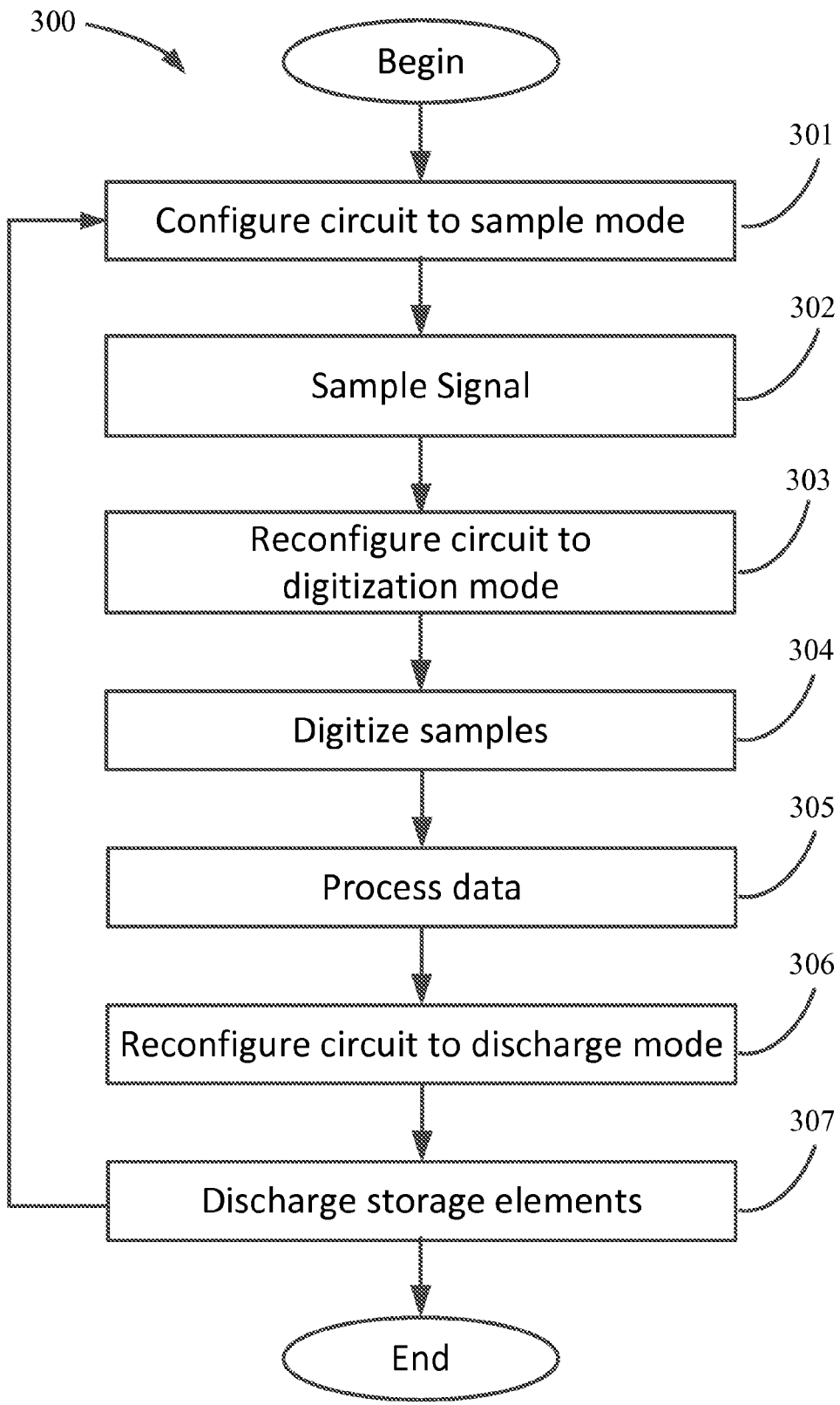
FIG. 3 is a flow chart describing the operation of the circuit of FIGS. 2A, 2C, 2D and 2E.

A method 300 of operating a sampling circuit 200 is schematically illustrated by a flow chart in FIG. 3.

Sample Capture Mode

In method 300, the circuit 200 is configured into a sample capture mode by controller 208. More specifically, at step 301 the controller sets the switch 206 to couple the output of amplifier 205 to the terminal 207A of the multiplexer 207. To that end, the controller 208 may provide control signals to the switch 206 via control bus 232.

In FIG. 2A, the switch 206 is configured to conduct current from node 220 to the multiplexer input 207A, but in other modes is configured to couple the multiplexer input 207A to other poles for other purposes under the control of a controller 208, as explained further below.

At step 302, the circuit 200 samples the reflection signal 107. More specifically, the controller 208 controls the multiplexor 207 to sequentially couple each of the plurality of capacitors (211-1, 211-2 . . . 211-n) to the output of the amplifier 205, as described above. To that end, the controller 208 may provide multiplexer control signals to the multiplexor 207 via multiplexer control bus 238.

The multiplexor 207 is configured to capture multiple, sequential samples at consecutive times (e.g., 150-1, 150-2 . . . 150-n, as schematically illustrated in FIG. 1D) of each current pulse 225 by successively coupling the input 207A to each of a plurality of analog storage elements (211-1, 211-2 . . . 211-n) via a corresponding plurality of multiplexer terminals (207-1, 207-2 . . . 207-n).

In the embodiment of FIG. 2A, the analog storage elements (211-1, 211-2, etc.) are capacitors. The first sample is captured on capacitor 211-1, by controlling the multiplexor 207 to couple the multiplexor input 207A to multiplexor terminal 207-1 for a first sample period. The second sample is captured on capacitor 211-2, by controlling the multiplexor 207 to couple the multiplexor input 207A to multiplexor terminal 207-2 for a second sample period, the second sample period following the first sample period. Subsequent samples are captured on the remaining capacitors, in order (e.g., 211-3 . . . 211-n) for a total of "n" samples, where "n" is an integer number of capacitors.

In other words, the current output of amplifier 205 is routed to a first capacitor (211-1) for a first time period (e.g., K nanoseconds), and then switched to a subsequent capacitor (211-2) for second time period (e.g., K nanoseconds), and so forth for many samples.

Generally, for various embodiments described herein, it may be convenient to think of storage element 211-1 as dedicated to storing a first sample of a signal, storage element 211-2 as storing a second sample of the same signal, and so forth, such that storage element 211-n is dedicated to storing the nth sample, etc. However, the storage elements (211-1, 211-2 . . . 211-n) may be configured or used in different arrangements and orders, as dictated by the system being designed. In addition, in some embodiments, the controller 208 may be configured to control the multiplexer 207 to couple the terminal 207A to each of the terminals (207-1, 207-2 . . . 207-n) in a repeating sequence or cycle—e.g., if the first sample is stored in storage element 211-1, the second sample is stored in storage element 211-2 and so forth until the nth sample is stored in storage element 211-n, the then next sample after the nth sample (e.g., sample n+1) is stored in (or summed with the content of) storage element 211-1 and the next sample (e.g., sample n+2) is stored in (or summed with the content of) storage element 211-2, etc. When one storage element (e.g., 211-1) stores a sample from a given sample time (e.g., 150-1), and another storage element (e.g., 211-3) stores a different sample from a subsequent sample time (e.g., 150-3), the storage element that stores the subsequent (in time) sample (e.g., 211-3) may be described as being subsequent to the storage element that stores the sample from the given time (e.g., 211-1). Similarly, the storage element (e.g., 211-1) that holds sample from a given time (e.g., 150-1) may be described as preceding a storage element (e.g., 211-3) that stores a sample from a subsequent time (e.g., 150-3). Similarly, two storage elements (e.g., 211-1 and 211-2) that store samples taken at two immediately adjacent or immediately succeeding times (e.g., 150-1 and 150-2) may be said to be immediately adjacent to one another, and in particular one storage element (e.g., 211-1) may be said to immediately precede the next (e.g., 211-2), just as one storage element (e.g., 211-2) may be said to immediately succeed its predecessor (e.g., 211-1).

As the multiplexor 207 successively couples the current pulse 225 to each such capacitor, each capacitor receives a portion of charge from the current pulse 225, and stores that current as electrical charge according to the equation $i=dq/dt$, where "i" is the electrical current and "dq/dt" is the time rate of charge flow represented by the current. As such, the amount of charge on each capacitor (211-1, 211-2, etc.) depends on the length of time for which that capacitor is coupled to the output of amplifier 205 (e.g., $q=Ct$, where "t" is the length of time during which a capacitor with capacitance "C" is coupled to a current source producing current "i"). Further, as current is coupled to each capacitance, the voltage on each such capacitance will rise according to the equation $i=Cdv/dt$, where "i" is the current, "C" is the capacitance of the capacitor, and "dv/dt" is the time-rate-of-change of the voltage in response to the incoming current.

Because the output of the amplifier 205 is current proportional to the radiation 204 received at the diode 203, each capacitor (211-1, 211-2, etc.) will have a voltage proportional to the radiation received by the diode 203 over a particular span of time after the transmission pulse 106 is transmitted. In some embodiments, the initiation of the sampling of step 302 is delayed for a period after the transmission pulse 106 is transmitted so that the receiver 120 does not process reflections from near-field objects (e.g., parts of an vehicle in which an object detection system is disposed).

As just one illustrative example, for a system having 16 capacitors (i.e., n=16) and a maximum path length (e.g., two times the distance 101) of 15 meters, the flight time of a transmitted pulse 106 will be approximately 50 ns. If the sample rate is 160 MHz, then each capacitor (211-1, 211-2 . . . 211-16) is exposed to incoming charge (i.e., will accumulate charge from current 225) for 6.25 ns.

As such, each capacitor (211-1, 211-2, etc.) holds a charge (and therefore presents a voltage) proportional to the current signal 225 (and therefore proportional to the reflected pulse 107) at the time at which the multiplexer 207 couples the signal 225 to the capacitor. In other words, the circuit 200 rapidly captures a series of samples of the reflection signal 107—one sample in each of "n" capacitances—without the need for an analog-to-digital converter capable of sampling at such a fast rate.

Figure 1E:
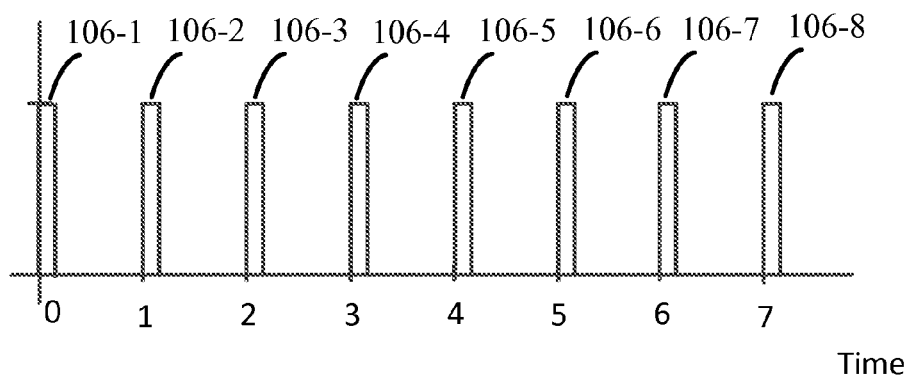
FIG. 1E schematically illustrates a series of infrared pulses transmitted by a laser detection and ranging system.
Figure 1F:
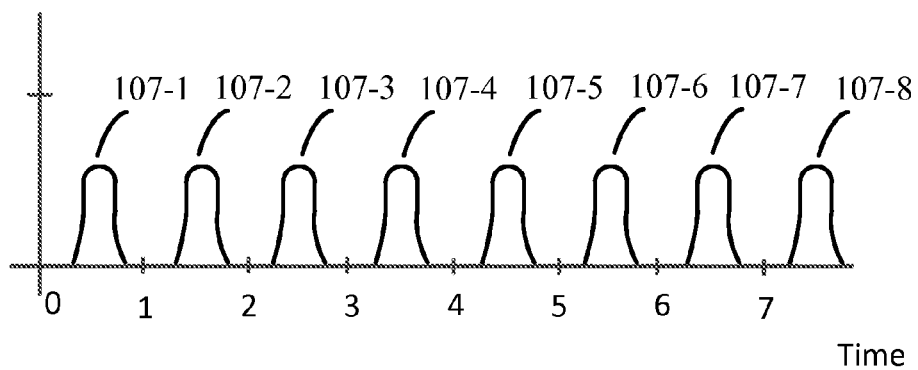
FIG. 1F schematically illustrates a series of a reflected infrared pulses corresponding to the series of transmitted infrared pulses in FIG. 1E.

Although the foregoing example describes the processing of a single reflection pulse 107 corresponding to a single transmitted pulse 106, some embodiments operate on multiple pulses, such as a series of transmitted pulses (106-1, 106-2, etc.) as schematically illustrated in FIG. 1E, and a series of corresponding reflection pulses (107-1, 107-2, etc.) as schematically illustrated in FIG. 1F. Indeed, some embodiments operate on sets of one thousand or more consecutive pulses. Further, some embodiments sample multiple reflection pulses (107-1, 107-2, etc.), and sum and store such samples in the analog domain, before digitizing them.

For example, a circuit 200 may sample multiple current pulses (225-1, 225-2, etc.; see FIG. 2B) corresponding to multiple transmitted pulses (106-1, 106-2, etc.), and store the corresponding samples in corresponding capacitors (211-1, 211-2, etc.). In such a process, the first sample (e.g., 150-1) from a first pulse (e.g., 225-1) is stored in a first capacitance (211-1), and a second sample (e.g., 150-2) from the first pulse (225-1) is stored in a second capacitor (211-2), and so forth. Subsequently, a second pulse (e.g., 225-2) is sampled, and the first sample (150-1) from the second pulse 225-2 is summed with the first sample already stored on the first capacitor 211-1 (e.g., from the first pulse 225-1), and stored on that first capacitor 211-1. Similarly, the second sample (e.g., 150-2) from the second pulse (225-2) is summed with the second sample already stored on the second capacitor (211-2), and so forth for all samples from each pulse. In this way, the samples from each pulse (225) are summed with corresponding samples from any number of preceding and/or following pulses, all on the available capacitors. As a result, the voltage on each of the capacitors (211-1, 211-2, etc.) is a sum of all samples stored to that capacitor.

In some embodiments, each of the capacitors (211-1, 211-2, etc.) has an identical capacitance. However, the inventor has realized that a reflection pulse 107 from an object near the receiver (e.g., object 105 in FIG. 1A, which is a distance 101 from the receiver 120) will have a larger amplitude than a reflection pulse from an object that is further away from the receiver 120, due to the greater dissipation of the infrared energy experienced by an infrared pulse traveling a longer distance. If all of the capacitors (211-1, 211-2, etc.) in a circuit 200 were of identical capacitance, then the voltage produced on capacitors exposed to a quickly-reflected pulse 107 would be greater than the voltage produced no capacitors exposed to a less-quickly reflected pulse 107.

Consequently, the inventor realized that the captured voltages could be kept more nearly uniform if the capacitors storing samples taken longer after the transmission of a transmitted pulse 106 (e.g., 211-n) were smaller (i.e., had a smaller capacitance) than the capacitors storing samples relatively closer in time to the transmission of the transmitted pulse 106 (e.g., 211-1, 211-2).

As such, the capacitances (211-1, 211-2 . . . 211-n) in some embodiments are of varying sizes, for example according to the flight time of a reflection pulse 107 that would be sampled each such capacitor. More specifically, the capacitance of the capacitor 211-2 that captures the second sample is smaller than the capacitance of the capacitor 211-1 that captures the first sample, in proportion to the decrease in signal size expected due to increasing flight times. Likewise, the capacitance of the capacitor 211-3 that captures the third sample is smaller than the capacitance of the capacitor 211-2 that captures the second sample. If the sample times (150-1, 150-2, etc.) are equally spaced, then the ratio of the capacitances of any two successive capacitors (e.g., 211-2/211-1) may be the same as the ratio of any other two successive capacitances (e.g., 211-3, 211-2; etc.), where the ratio (M) is less than one.

As such, in some embodiments the relationship between any two successive capacitors (211-1, 211-2 . . . 211-n) may be expressed as:

$$C_{x+1} = MC_x;$$

where "$C_x$" is the capacitance of one capacitor (e.g., 211-2), "$C_{x+1}$" is the capacitance of a next capacitor (e.g., 211-3), and "M" is a unit-less scaling factor (i.e., a scalar) having a value less than one (i.e., M<1). The scaling factor (M) may be a constant, or may vary, for example depending on the flight time of the transmitted pulse 106 and reflected pulse 107 or the time between samples.

In other words, in some embodiments the capacitors that store samples decrease in capacitance with the point in time at which the samples are captured. If capacitor 211-1 stores the first sample, and capacitor 211-2 stores the second sample, then capacitor 211-2 has a smaller capacitance than capacitor 211-1. Similarly, if capacitor 211-3 stores the third sample, then capacitor 211-3 has a smaller capacitance than capacitor 211-2, and so forth for all of the analog storage capacitors (211-1, 211-2 . . . 211-n).

In this way, a processing circuit may avoid the need to include a programmable-gain amplifier to adjust or normalize samples on the fly, and may reduce the work otherwise required of a processor (e.g., processor 271) in that the processor, and its programmed code, need not process signals that vary greatly with the distance travelled by their corresponding pulses.

Digitization Mode

After one or more pulses are sampled, the samples may be digitized in a digitization mode. An embodiment of a circuit 200 in a digitization mode is schematically illustrated in FIG. 2C, and is the same as the circuit 200 in FIG. 2A, except that the switch 206 is configured to couple the multiplexer terminal 207A to the input terminal 209B of an analog-to-digital converter 209.

More specifically, at step 303 the controller 208 sets the switch 206 to couple the terminal 207A of the multiplexer 207 to the input 209B of the converter 209, as described above. To that end, the controller 208 may provide control signals to the switch 206 via control bus 232 and to the converter via control line 233.

Then, in step 304, the multiplexor 207 individually couples each capacitor (211-1, 211-2 . . . 211-n) to switch terminal 206D, and thereby to the input 209B of the converter 209 via switch terminal 206B. The converter 209 then digitizes the voltage on each capacitor (211-1, 211-2 . . . 211-n) under control of the controller 208 via converter control line 233, and outputs a corresponding sequence of digital words on output 209A. The digital words may, in turn, be stored in digital memory 270 and/or processed in a processor 271 via data bus 260.

Because the digitization (step 304) occurs after the arrival of the corresponding reflection pulse 107, and therefore during the time 162 between transmitted pulses, the digitization process may occur at a rate substantially slower than the rate at which the signal is sampled.

For example, in an illustrative embodiment, the signal may be sampled at a sample rate of 200 MHz, and the samples may be converted at a relatively leisurely 10 KHz. As a practical matter, such a system and method achieve higher performance at less cost than a system and method that directly samples the signal with a fast analog-to-digital converter. For example, a 100 Mega-samples per second (100 MPSP) converter, which takes a new sample every 10 ns, can resolve a distance only to approximately plus-or-minus 5 feet (1.52 meters). Such resolution may not be sufficient for some applications, such as systems that detect the distance between a vehicle and an object near the vehicle.

Data Processing Mode

Once the digitized samples are stored in memory 270, or provided directly to the processor 271, the programmed processor 271 may execute computer code to evaluate the digitized samples to determine which sample or samples fall within the reflected pulse 107 (step 305). To that end, the processor may, in some embodiments, assess all of the digitized samples to determine which of those samples has the greatest amplitude, and identify that sample as the sample that represents the reflection pulse (which may be known as the "key sample").

In other embodiments, the processor 271 may assess the digitized samples to identify a rising edge 107R of the reflection pulse 107. For example, a rising edge 107R of a reflection pulse 107 may be recognized by an increase in amplitude of two or more successive samples, such as between samples 150-5 and 150-8, for example. One of the samples within a rising edge 107R could be identified as representing the reflection pulse, and may be known as the "key sample."

Because the samples are captured at known times, relative to the time ("Tt") that a transmission pulse is transmitted, the time at which the key sample was captured may be used to determine the distance of the object 105 from the transmitter 110 and receiver 120, according to the speed of light. More specifically, the distance 101 of the object 105 from the transmitter 110 and receiver 120 maybe be computed as D=C(Ts/2), where D is the distance (i.e., 101), "C" is the speed of light, and Ts is the time that the key sample was taken, relative to the time of transmission of the infrared pulse 107 from the transmitter 110 (e.g., the total flight time).

Discharge Mode

After a signal, or series of signals, have been processed, the method may clear the analog storage elements (211-1, etc.). To that end, the method 300 reconfigures the circuit 200 to be in a discharge mode (step 306). FIG. 2D schematically illustrates circuit 200 configured to discharge capacitors 211-1 ... 211-n. In this mode, the switch 206 is configured to couple the multiplexer terminal 207A to ground.

In this configuration, the multiplexor 207 individually couples each capacitor (211-1, 211-2 ... 211-n) to switch terminal 206D, and thereby to ground via switch terminal 206C (step 307). As such, each capacitor (211-1, 211-2 ... 211-n) discharges its accumulated charge to ground, and is ready to receive fresh samples for a later reflection pulse 107. To that end, the method 300 may return to step 301. Alternately, the method 300 may terminate.

In a preferred embodiments, the digitization of samples and the discharge of the storage elements (211-1, etc.) corresponding to a first transmitted pulse (e.g., 106-1) is completed before the transmission of an immediately subsequent transmitted pulse (e.g., 106-2). Indeed, in some embodiments, the processing of the digitized data (step 305) and/or the discharge of the storage elements (step 307) may also be completed before the transmission of an immediately subsequent transmitted pulse.

Figure 4:
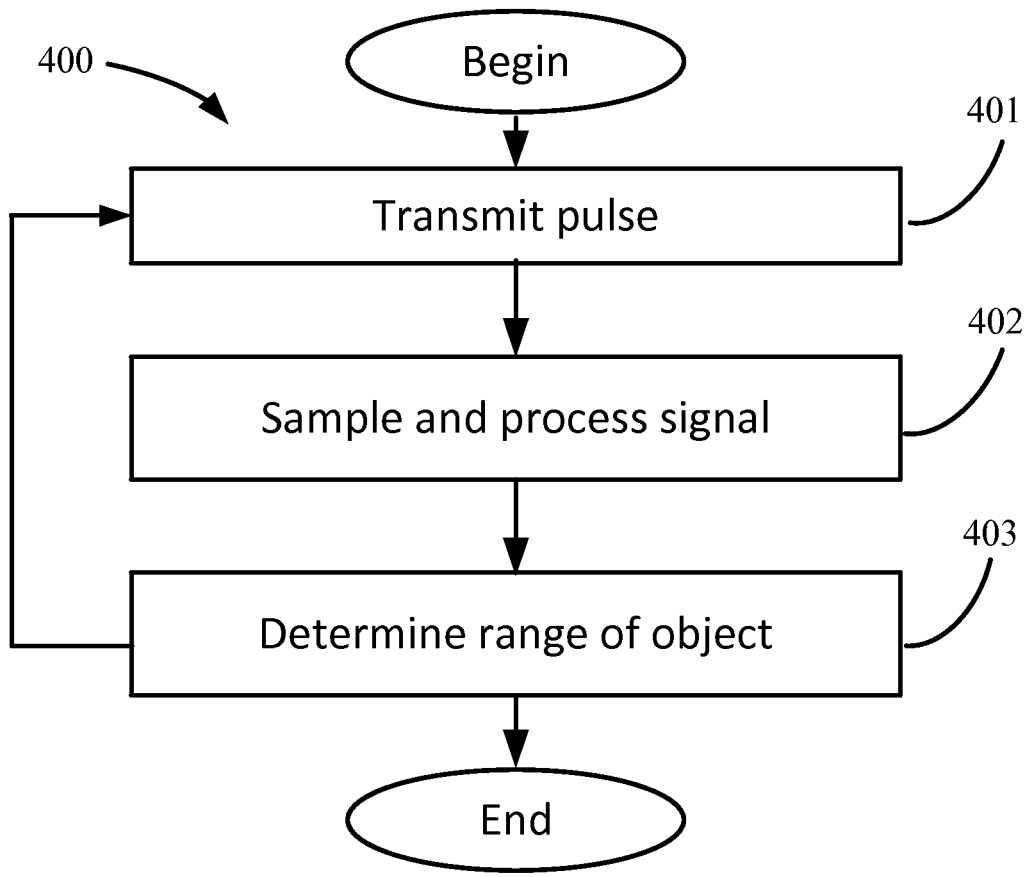
FIG. 4 is a flow chart describing a method of operation of an object detection system.

FIG. 4 is a flow chart describing a method 400 of operating an object detection system having a circuit 200. At step 401, the controller 208 initiates transmission of a transmission pulse 106 via sending a control signal to the transmitter 110 via transmitter control lines 234.

At this step 401, the controller 208 may also configure the multiplexer 207 to be prepared to capture a first sample, by coupling terminal 207A to a storage element configured to store a first sample (e.g., storage element 211-1). As such, the sampling of a reflection signal (e.g. 107) may be synchronized with the transmission of a pulse (e.g., 106). In other words, the controller (or "control circuit") 208 may be configured to send a transmission control signal to the infrared transmitter 110 via transmitter control bus 234 to initiate transmission, by the infrared transmitter 110, of an infrared pulse 106 and, substantially simultaneously with the transmission of the transmission control signal, to couple the analog output of the infrared receiver to a first one 211-1 of the plurality of analog storage elements (211-1, 211-2, etc.), the first one of the analog storage elements 211-1 configured to store a first sample from each of the plurality of infrared pulses (206-1, 106-2, etc.).

Subsequently, at step 402, the circuit 200 captures samples of a reflection pulse 107 corresponding to the transmission pulse 106, as described for example in connection with method 300.

At step 403, the method 400 determines the range or distance, from the transmitter 110 and receiver 120, of an object (e.g., 105) from which the transmission pulse 106 is reflected to create the reflection pulse 107. The distance (e.g., distance 101) may be determined by calculating the flight time of the transmission pulse 106 and reflection pulse 107, for example by identifying a key sample from the reflection pulse 107 and determining the time that the key sample arrived at the receiver. The range of the object 105 may then be calculated as the speed of light (e.g., approximately 299,705 km/s in air) times the flight time (for example, time 705 of FIG. 7C), divided by two. The process 400 may then repeat by returning to step 401, or may terminate, as illustrated in FIG. 4.

Figure 5A:
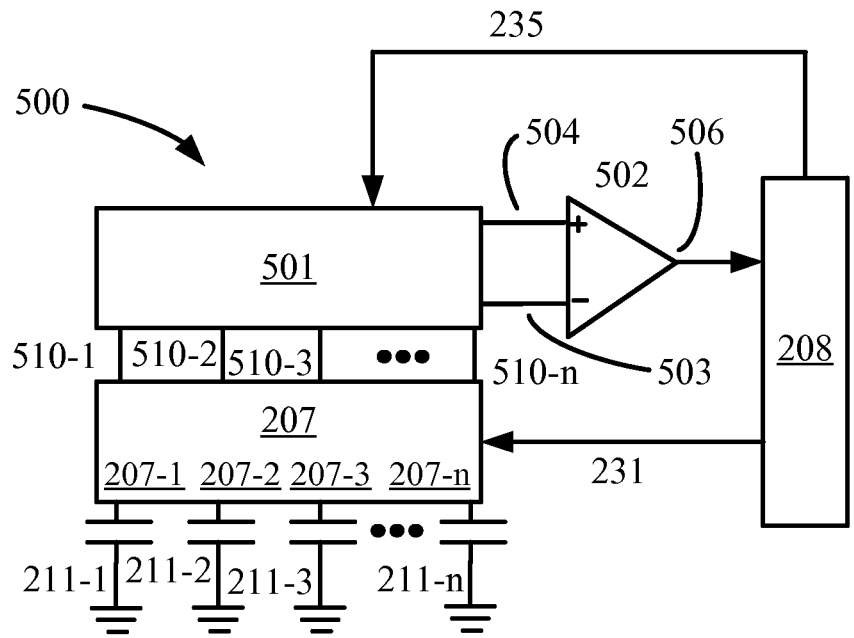
FIGS. 5A and 5B schematically illustrate alternate embodiment of signal processing circuits.

An alternate embodiment of a signal processing circuit 500 is schematically is illustrated in FIG. 5A, and includes multiplexer 207 and storage elements 207-1, etc., as well as controller 208. This embodiment also includes a two-channel readout multiplexer 501, coupled to the multiplexer output terminals 510-1, 510-2 ... 510-n, each of which is electrically coupled to a corresponding one of the storage elements 211-1, 211-2 ... 211-n. Although the multiplexer output terminals (510-1, 510-2 ... 510-n) are illustrated as separate terminals in FIGS. 5A and 5B, they may be one and the same as, or form an electrical node with, multiplexer terminals (207-1, 207-2 ... 207-n).

The readout multiplexer 501 is configured to separately couple any two of the storage elements 211-1, 211-2 ... 211-n to the inputs 503 and 504 of comparator 502, under control of the controller 208. The controller 208 may control readout multiplexer 501 through control signals on bus 235. The readout multiplexer 501 may be two standard multiplexers, one of which is configured to couple one of the storage elements 211-1, 211-2 . . . 211-*n* to the inputs 503 comparator 502, and the other of which is configured to couple a different one of the storage elements 211-1, 211-2 . . . 211-*n* to the inputs 504 comparator 502, all under control of the controller 208.

In operation, the controller 208 couples a signal from storage element 211-1 to the positive input 504 of the comparator 502, and couples a signal from the storage element 211-2 to the negative input 503 of the comparator 502. The comparator 502 provides an output 506 to the controller 208 to indicate whether the signal at input 504 exceeds the signal on input 503. The controller then configures the readout multiplexer 501 to couple the larger of those two signals to the negative input 503 of the comparator 502, and to couple a signal from storage element 211-3 to the positive input 504 of the comparator 502, and continues in this manner until the controller has identified the largest of the signals from the storage elements 211-1, 211-2 . . . 211-*n*, and that signal is identified as the key sample.

Figure 5B:
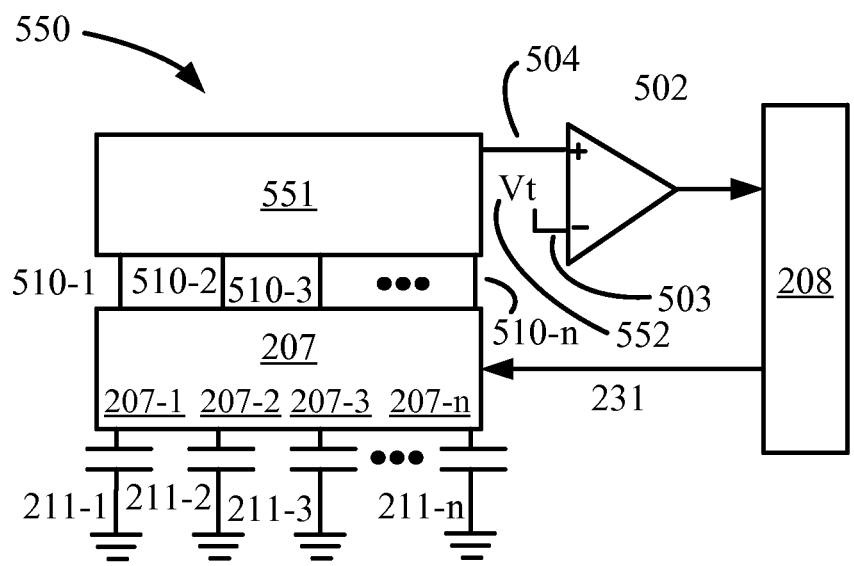

Yet another embodiment of a signal processing circuit 550 is schematically is illustrated in FIG. 5B. The circuit 550 includes a single channel readout multiplexer 551 configured to couple any one of the storage elements 211-1, 211-2 . . . 211-*n* to the positive input 504 of comparator 502. The negative input 504 of the comparator 502 is coupled to a threshold voltage 552. The controller 208 sequentially couples each of the storage elements 211-1, 211-2 . . . 211-*n* to the positive input 504 of comparator 502 to determine when the sampled signal exceeds the threshold represented by the threshold voltage, so as to identify a rising edge (e.g., 107R) of a received signal (e.g., 107). The first sample that signal exceeds the threshold may be identified as the "key sample."

Figure 6:
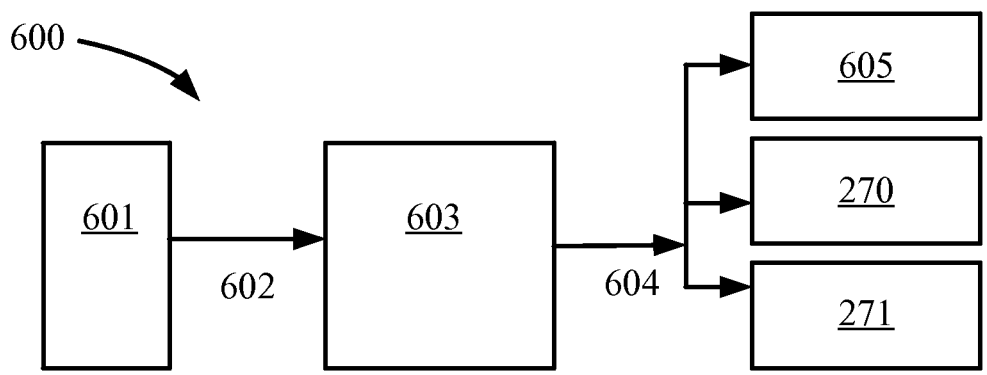
FIG. 6 schematically illustrates a system for rapidly sampling a signal.

Although various embodiments have been illustrated in the context of a distance sensor, the principles described above may be applied to rapidly sample any signal. A system 600 for processing an input signal is schematically illustrated in FIG. 6. A signal 602 to be processed may be produced by any signal source 601, such as a receiver, transducer such as a microphone, accelerometer or gyroscope, or any other device the produces a voltage or current signal.

The signal 602 is provided to sampling circuit 603. Sampling circuit 603 includes circuits for rapidly sampling the signal 602, for example as illustrated in FIG. 1D for example, and storing the samples in the analog domain, such as the circuits schematically illustrated in FIGS. 2A, 2C and 2D, for example. The sampling circuit 603 may also digitize the samples, and provide the digitized samples 604 to microprocessor 271, or to a memory 270. Alternately, the sampling circuit 603 may provide the sample in the analog domain to an analog processing circuit 605.

FIGS. 7A-7D schematically illustrate an example of the relative timing of the operation of a system, such as system 109 for example. The time graphs of FIGS. 7A-7D are synchronized in time with one another, according to time zero (701, at the origin of each time graph).

In the time graph of FIG. 7A, the controller 208 sends a transmitter control signal 701-1 to the transmitter 110 to cause the transmitter 110 to transmit (FIG. 7B) an infrared pulse 106-1, at time zero (701), and a sends a subsequent transmitter control signal 702-2 to the transmitter 110 at a subsequent time 703 to cause the transmitter 110 to transmit an infrared pulse 106-1, at time one 703. For purpose of this illustration, the transmitter 110 sends each infrared pulse (106-1, 106-2) substantially simultaneously with the receipt by the transmitter 110 of each transmitter control signal (702-1, 702-1).

In some embodiments, the controller 208 may also configure the multiplexer 207 to be prepared to capture a first sample, by coupling terminal 207A to a storage element configured to store a first sample (e.g., storage element 211-1), such that the sampling of a reflection signal (e.g. 107-1) may be synchronized with the transmission of a pulse (e.g., 106-1), as described above in connection with step 401 of process 400.

The infrared pulses (106-1, 106-2, etc.) reflect off of an object (e.g., 105) and a series of reflection pulses (107-1, 107-2, etc.) impinge on infrared receiver 120 after a time (flight time) 705, as described above (see FIG. 7C). As such, the controller 208 also sends multiplexer control signals 711 to the multiplexer 207 via multiplexer control bus 238 (FIG. 7D) to cause the multiplexer 207 to cause the circuit 200 to sample each of the reflection pulses (107-1, 107-2, etc.), as schematically illustrated for example in FIG. 1D. Although the multiplexer control signals 711 (and therefore the sampling) are schematically illustrated as beginning at a point in time 712 just before the arrival of a reflection pulse 107 and ending at a point in time 713 just after the passing of the reflection pulse 107, this is not a limitation of any system or process described herein. For example, the sampling of the output of an infrared receiver 110 may commence simultaneously with the transmission of an infrared pulse (e.g., 106-1) and continue after the passing of the infrared pulse. Indeed, such sampling may continue for most or all of the time between receipt of reflection pulses (107-1, 107-2).

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A method of sampling a plurality of infrared pulses impinging on a receiver, the method including:

sequentially capturing a plurality of samples for each pulse of the plurality of pulses;

summing, in the analog domain, each sample with all corresponding samples from each of the plurality of pulses, to produce a plurality of analog sums; and converting each of the plurality of analog sums to a digital format to produce a corresponding plurality of digital sums.

P2. The method of potential claim P1 wherein each pulse comprises an electrical current.

P3. The method of potential claim P1, wherein the step of summing each sample with all corresponding samples includes storing each of the plurality of samples in a corresponding plurality of analog storage elements, each such analog storage element configured to sum each such sample with all preceding samples stored on such analog storage element, such that the plurality of analog storage elements hold a corresponding plurality of analog sums prior to the step of converting.

P10. A method of sampling a signal comprising:
rapidly capturing a plurality of sequential analog samples from the signal at a sample rate; and
storing each of the plurality of analog samples in a corresponding plurality of analog storage elements.

P11: The method of potential claim P10, further comprising:
reading each of the analog storage elements by coupling each of the plurality of analog storage elements to an analog-to-digital converter; and
converting each of the plurality of analog samples to a digital value using the analog-to-digital converter.

P12: The method of potential claim P11, wherein the step of reading each of the analog storage elements comprises sequentially coupling each of the plurality of analog storage elements to an analog-to-digital converter at a reading rate slower than the sample rate.

P13: The method of potential claim P12, wherein sample rate is at least ten times the reading rate.

P14: The method of potential claim P10, further comprising:
reading at least one of the samples by coupling at least one of the analog storage elements to a comparator, the comparator configured to compare each of the plurality of samples to a pre-determined threshold;
identifying the first sample that exceeds the pre-determined threshold, said sample being identified as a key sample.

P15: The method of potential claim P10, further comprising:
comparing each sample of the plurality of samples to each other sample from the plurality of samples; and
determining which of the plurality of samples has the greatest amplitude, said sample being identified as a key sample.

P16: The method of either of potential claim P14 or potential claim P15, further comprising:
determining the time at which the key sample was captured, relative to the time that a transmitted pulse was transmitted; and
calculating, based on the time at which the key sample was captured, the distance between a transmitter that transmitted the transmitted pulse and an object that reflected the transmitted pulse.

P20. A system for sampling a signal (e.g., a plurality of infrared pulses) impinging on a receiver, the system comprising:
an infrared receiver configured to provide an analog output;
a switching circuit comprising a first terminal coupled to the infrared receiver and configured to receive the analog output, and a second terminal, the second terminal controllably couplable to the first terminal;
a bi-directional analog multiplexing circuit comprising an input terminal coupled to the second terminal of the switching circuit, and a plurality of output terminals; and
a plurality of analog storage elements, each of the analog storage elements coupled to a corresponding one of the plurality of output terminals and configured to hold a plurality of sequential samples,
such that, in a sample capture configuration, the analog output of the infrared receiver may be sequentially coupled to the plurality of analog storage elements, and wherein:
the analog storage elements comprise a plurality of at least 3 capacitors, the plurality of capacitors comprising first capacitor configured to store a first sample, and a plurality of subsequent capacitors each configured to store one of a plurality of subsequent samples, such that each of the subsequent capacitors is associated with an immediately preceding capacitors within the plurality of capacitors, and wherein
each of the subsequent capacitors has a smaller capacitance than the first capacitor, and each of the subsequent capacitors is related to its immediately preceding capacitor by the following formula:

$$C_{n+1} = MC_n$$

wherein $C_{n+1}$ is a capacitor, $C_n$ is its immediately preceding capacitor, and M is a scalar having a value less than one.

P30. A system for sampling a plurality of infrared pulses impinging on a receiver, the system comprising:
an infrared receiver configured to provide an analog output, the analog output comprising an electrical current proportional to infrared radiation impinging on the infrared receiver;
a switching circuit comprising a first terminal coupled to the infrared receiver and configured to receive the analog output, and a second terminal, the second terminal controllably couplable to the first terminal;
a bi-directional analog multiplexing circuit comprising an input terminal coupled to the second terminal of the switching circuit, and a plurality of output terminals;
an amplifier configured to buffer the electrical current output of the infrared receiver and to supply a buffered current to the bi-directional analog multiplexing circuit via the switching circuit; and
a plurality of analog storage elements, each of the analog storage elements coupled to a corresponding one of the plurality of output terminals and configured to hold a plurality of sequential samples,
such that, in a sample capture configuration, the analog output of the infrared receiver may be sequentially coupled to the plurality of analog storage elements.

P31. The system of potential claim 30, wherein the analog storage elements are capacitors configured to store charge delivered by the buffered current when the system is in the sample capture configuration.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of processing an analog signal, the method comprising:
    transmitting, at a transmission time, an infrared pulse from an infrared transmitter towards an object;
    capturing, at a sampling frequency, a plurality of samples in the analog domain, each of the plurality of samples having an amplitude and comprising a portion of a reflection of the infrared pulse from the object, such that the plurality of samples represents the reflection at a plurality of sequential times after the transmission time;
    sequentially storing each of the plurality of samples in a corresponding plurality of analog storage elements;
    retrieving, at a retrieval frequency, each of the plurality of stored samples from the plurality of analog storage elements, the retrieval frequency being slower than the sampling frequency;
    selecting at least one sample from among the plurality of samples, and determining the reception time or times, relative to the transmission time, at which the at least one selected sample was received.

2. The method of claim 1, wherein sequentially retrieving, at a retrieval frequency, each of the plurality of stored samples further comprises converting each of the plurality of stored samples to a digital format.

3. The method of claim 1, wherein
    each of the plurality of analog storage elements represents a distance between the infrared transmitter and the object based on the time, from among the plurality of sequential times after the transmission times, at which the sample in each of said analog storage elements was captured, and
    the method further comprises determining a distance between the infrared transmitter and the object by multiplying one-half the speed of light by the capture time of the selected sample.

4. The method of claim 3, wherein the selected sample comprises a sample, from among the plurality of samples, having the greatest amplitude.

5. A method of detecting an object using infrared pulses, comprising:
    transmitting a plurality of infrared pulses from an infrared transmitter;
    receiving, at an infrared receiver, a plurality of infrared reflections, the plurality of infrared reflections comprising reflections of the transmitted pulses from the object;
    in a sample capture phase, for each of the plurality of infrared reflections:
        capturing a plurality of analog samples at a plurality of distinct sample times; and
        summing, in the analog domain, each of the plurality of analog samples with all samples from corresponding sample times from all previous infrared reflections, in a corresponding plurality of analog storage elements, such that each of the plurality of analog storage elements stores an analog value representing a sum of corresponding samples.

6. The method of claim 5, further comprising:
    in a readout phase, following the sample capture phase:
        sequentially retrieving, at a retrieval frequency, each of the plurality of stored samples from the plurality of analog storage elements, the retrieval frequency being slower than the sampling frequency.

7. The method of claim 6, wherein sequentially retrieving each of the plurality of stored samples further comprises determining which of the stored samples has the greatest amplitude.

8. The method of claim 6, wherein sequentially retrieving each of the plurality of stored samples further comprises converting the analog values to a digital format using an analog-to-digital converter to produce a corresponding plurality of digital sums.

9. The method of claim 5, wherein the infrared receiver is configured to output a current proportional to an amplitude of an impinging infrared pulse, and wherein:
    each of the analog storage elements comprises a capacitor; and
    each of the analog values comprises a voltage.

10. The method of claim 6, wherein the method further comprises:
    discharging each of the analog storage elements after the readout phase.

11. A system for sampling a plurality of infrared pulses impinging on a receiver, the system comprising:
    an infrared receiver configured to provide an analog output as a function of infrared radiation impinging on the infrared receiver;
    a switching network comprising a first terminal coupled to the infrared receiver and configured to receive the analog output, and a plurality of output terminals; and
    a plurality of analog storage elements, each of the analog storage elements coupled to a corresponding one of the plurality of output terminals and configured to hold a plurality of sequential samples,
    such that, in a sample capture configuration, the analog output of the infrared receiver may be sequentially coupled via the switching network to the plurality of analog storage elements so as to sequentially capture, in each of the analog storage elements, a plurality of samples.

12. The system of claim 11, wherein:
    the analog output of the infrared receiver is a current proportional to the intensity of infrared radiation impinging on the infrared receiver; and
    the plurality of analog storage elements comprise a plurality of capacitors.

13. The system of claim 11, wherein:
    the switching network comprises:
        a switching circuit comprising a first terminal coupled to the infrared receiver and configured to receive the analog output, and a second terminal, the second terminal controllably couplable to the first terminal, and a third terminal, wherein the second terminal is also controllably couplable to the third terminal;
        a bi-directional analog multiplexing circuit comprising an input terminal coupled to the second terminal of the switching circuit, and a plurality of output terminals; and the system further comprises:

an analog-to-digital converter configured to be controllably coupled to the plurality of analog storage elements via the bi-directional analog multiplexing circuit and the switching circuit when the system is in a readout configuration.

14. The system of claim 11, the system further comprising:
a control circuit, the control circuit configured to control the bi-directional analog multiplexing circuit and the switching circuit to operate in a sampling mode in which the output of the infrared receiver is sequentially coupled to each of the analog storage elements via the bi-directional analog multiplexing circuit and the switching circuit, and
in a readout mode in which each of the analog storage elements is sequentially coupled to an analog-to-digital converter via the bi-directional analog multiplexing circuit and the switching circuit.

15. The system of claim 14, wherein the switching network comprises a grounded terminal, and the control circuit is configured to sequentially couple each of the analog storage elements to ground via the switching network and the grounded terminal, when the system is in a discharge configuration.

16. The system of claim 11, the system further comprising:
a control circuit configured to control the bi-directional analog multiplexing circuit and the switching circuit; and
an infrared transmitter configured to transmit pulses of infrared radiation under control of the controller,
wherein the controller coordinates the transmission of a plurality of infrared pulses and the sampling of reflections of said plurality of infrared pulses from a remote object.

17. The system of claim 16, wherein the control circuit is configured to:
send a transmission control signal to the infrared transmitter to initiate transmission, by the infrared transmitter, of an infrared pulse and, substantially simultaneously with the transmission of the transmission control signal, to
couple the analog output of the infrared receiver to a first one of the plurality of analog storage elements, the first one of the analog storage elements configured to store a first sample from each of the plurality of infrared pulses.

18. The system of claim 11, wherein:
the analog storage elements comprise a plurality of capacitors, the plurality of capacitors comprising first capacitor configured to store a first sample, and a plurality of subsequent capacitors each configured to store one of a plurality of subsequent samples, such that each of the subsequent capacitors is associated with an immediately preceding capacitor within the plurality of capacitors, and wherein
each of the subsequent capacitors has a smaller capacitance than the first capacitor, and each of the subsequent capacitors is related to its immediately preceding capacitor by the following formula:

$$C_{n+1}=MC_n$$

wherein $C_{n+1}$ is a capacitor, $C_n$ is its immediately preceding capacitor, and M is a scalar having a value less than one.

19. A system for sampling a plurality of infrared pulses impinging on a receiver, the system comprising:
transducing means configured to convert the plurality of infrared pulses to a corresponding plurality of current pulses;
sampling means configured to sample, in the analog domain, the plurality of current pulses;
means for summing, in the analog domain, the plurality of current pulses.

20. The system of claim 19, further comprising a controller means configured to control the sampling means, and configured to control an analog-to-digital converter means.

* * * * *